(12) United States Patent
Ouchi

(10) Patent No.: US 7,139,769 B2
(45) Date of Patent: Nov. 21, 2006

(54) CATALOG, CATALOG QUERY, AND ITEM IDENTIFIER FOR CONFIGURABLE ITEMS

(76) Inventor: Norman Ken Ouchi, 20248 Viewcrest Ct., San Jose, CA (US) 95120

( * ) Notice: Subject to any disclaimer, the term of this patent is extended or adjusted under 35 U.S.C. 154(b) by 72 days.

(21) Appl. No.: 10/095,485

(22) Filed: Mar. 11, 2002

(65) Prior Publication Data

US 2003/0172051 A1 Sep. 11, 2003

(51) Int. Cl.
*G06F 17/30* (2006.01)

(52) U.S. Cl. .................... 707/102; 705/28
(58) Field of Classification Search ............ 707/102, 707/104.1; 705/28, 22
See application file for complete search history.

(56) References Cited

U.S. PATENT DOCUMENTS

| | | | | |
|---|---|---|---|---|
| 5,751,723 A | * | 5/1998 | Vanden Heuvel et al. | 370/528 |
| 5,842,212 A | * | 11/1998 | Ballurio et al. | 707/100 |
| 5,884,298 A | * | 3/1999 | Smith et al. | 707/2 |
| 5,918,214 A | * | 6/1999 | Perkowski | 705/27 |
| 6,029,160 A | * | 2/2000 | Cabrera et al. | 707/1 |
| 6,081,814 A | * | 6/2000 | Mangat et al. | 715/501.1 |
| 6,269,431 B1 | * | 7/2001 | Dunham | 711/162 |
| 6,418,441 B1 | * | 7/2002 | Call | 707/10 |
| 6,445,774 B1 | * | 9/2002 | Kidder et al. | 379/9.03 |
| 6,772,216 B1 | * | 8/2004 | Ankireddipally et al. | 709/230 |
| 2002/0007321 A1 | * | 1/2002 | Burton | 705/26 |
| 2003/0061121 A1 | * | 3/2003 | Ouchi | 705/27 |

* cited by examiner

Primary Examiner—Wayne Amsbury (57) ABSTRACT

The invention is related to electronic information transfer between trading partners and more particularly to the use of a catalog, catalog query, and item identifier to specify an item that has a number of configurations or features. The item identifier is used in business transactions between the trading partners. In the present invention, a configured item is associated with a two-part item identifier where one part is a systematically assigned, fixed length field that provides systematic identification of the catalog and the second part is a variable length field to identify the item in the catalog. A catalog and catalog query provide a means to generate the two-part item identifier based on the description of the configured item identifier. A catalog query with the item identifier can query the catalog to determine the description of the item.

20 Claims, 4 Drawing Sheets

CAPACITOR ORDERING INFORMATION

C 0805 C 103 K 5 R A C*

- CERAMIC
- SIZE CODE
- SPECIFICATION
  - C - Standard
- CAPACITANCE CODE
  - Expressed in Picofarads (pF)
  - First two digits represent significant figures.
  - Third digit specifies number of zeros. (Use 9 for 1.0 thru 9.9pF. Use 8 for 0.5 through 0.99pF)
  - (Example: 2.2pF = 229 or 0.50 pF = 508)
- CAPACITANCE TOLERANCE
  - B - ±0.10pF     J - ±5%
  - C - ±0.25pF    K - ±10%
  - D - ±0.5pF      M - ±20%
  - F - ±1%            P - (GMV) - special order only
  - G - ±2%           Z - +80%, -20%
- END METALLIZATION
  - C-Standard
  - (Tin-plated nickel barrier)
- FAILURE RATE LEVEL
  - A- Not Applicable
- TEMPERATURE CHARACTERISTIC
  - Designated by Capacitance
  - Change Over Temperature Range
  - G - C0G (NP0) (±30 PPM/°C)
  - R - X7R (±15%) (-55°C + 125°C)
  - P- X5R (±15%) (-55°C + 85°C)
  - U - Z5U (+22%, -56%) (+10°C + 85°C)
  - V - Y5V (+22%, -82%) (-30°C + 85°C)
- VOLTAGE
  - 1 - 100V     3 - 25V
  - 2 - 200V     4 - 16V
  - 5 - 50V       8 - 10V

* Part Number Example:
C0805C103K5RAC (14 digits - no spaces)

KEMET Electronics Corp. P. O. Box 5928, Greenville, SC 29606

Item Description Request - 1
Item Class: Capacitor
Type: Ceramic
Capacitance: 50 pF
Tolerance: 10%
Package: 0805
Temperature Range: -55C to +125C
Voltage: 50V
etc.

Two Part Item Identifier Response - 3

EAN UCC 14  GTIN   10614141005277

XML Character String   <c>C0805C103K5RAC</c>

Purchase order with Two Part Item Identifier - 4

Item Identifier: 10614141005277 <c> C0805C103K5RAC</c>
Quantity: 100

Two Part Item Identifier Response with property selection - 5

EAN UCC 14  GTIN   10614141005277

XML Character String   <c>C0805C103K*RAC</c>

XML Request String
<select name="Voltage">
<option value= "1"> 100v </option>
<option value= "2"> 200v </option>
<option value= "3"> 25v </option>
<option value= "4"> 16v </option>
<option value= "5"> 50v </option>
<option value= "8"> 10v </option>
</select>

CATALOG, CATALOG QUERY, AND ITEM IDENTIFIER FOR CONFIGURABLE ITEMS

CROSS-REFERENCE TO RELATED APPLICATIONS

Catalog and Item Identifier for Configurable Items; application Ser. No. 09/962,953; Ouchi, Norman Ken

STATEMENT REGARDING FEDERALLY SPONSORED RESEARCH OR DEVELOPMENT

None

FIELD OF THE INVENTION

This invention is related to electronic information transfer between trading partners and more particularly to the use of a catalog, catalog query, and item identifier to specify an item that has a number of configurations or features. The item identifier is used in business transactions between the trading partners.

BRIEF SUMMARY OF THE INVENTION

In the present invention, a configured item is associated with a two-part item identifier where one part is a standardized, fixed format field and the second part is a variable length field. A catalog and catalog query provide a means to generate the two-part item identifier based on the description of the configured item. The catalog query may request additional information to further define the description to generate the item identifier. A catalog query with the item identifier can query the catalog to determine the description of the item.

BACKGROUND OF THE INVENTION

A company sells items to their trading partners and lists the description of these items in a catalog. To aid in clearly specifying the item, the company assigns to each item an item identifier, called a part number or part name, which is used for order and other processes that require identification of the item. The item identifier is usually a short compact string of digits, letters, and special characters that may be processed by computer programs. People working with these item identifiers learn to recognize the items by their item identifiers. Since the item identifier need only be consistent within a company, the structure, format, meaning, etc. are unique for each company. Hence, each company has its own item identification system. When buyer orders an item from a seller, the buyer usually orders the item using the identification system of the seller but in some industries such as electronics, the buyer may order an item using the item identifier of the buyer. When the seller's identifier is used, the seller provides a catalog so that buyers can find the item using the description provided by the seller and use the item identifier to order the item. The catalog and item identifier mechanism has worked for a very long time and is a corner stone for commerce.

The item identifier has a one-to-one mapping to the "orderable" item. As an example, a sugar provider sells sugar. However, the sugar is not sold as "sugar" but as bags of sugar from a finite set of sizes for example: 10 pound bag, 50 pound bag, 100 pound bag, etc. Each bag size is assigned an item identifier so that a buyer can purchase a specific number of a specific bag size. For example, the 10 pound bag is assigned the identifier "S10", 50 pound bag the identifier "S50", and 100 pound bag the identifier "S100". When the sugar supplier received an order for "6-S50", then six 50 pound bags were ordered.

The catalog structures and item identifier mechanisms worked well for processes that had people executing the process steps. People can accommodate high levels of variability and still function. However, computer systems are now used to execute these processes. These systems and the programs that support the processes are fast, accurate, and dumb. Small variations may require that the programs be modified or rewritten. There are significant advantages for industries to standardize the item identifier and the catalog. The item identifier for most grocery items is the Universal Product Code, UPC, which is seen as the bar code on the item. The UPC is twelve-digit string where six digits identify the selling company and five digits are assigned by the company to identify their products. One digit is a check digit. The company has freedom to assign their five digits as item identifiers for its products. Most companies have less than 100,000 orderable products so the five-digit limit is workable. The grocery and other industries have had significant success in implementing the UPC and gained substantial financial benefit through the changes in the business processes supported by the UPC. However, the electronics industry lead by a strong industry consortium, RosettaNet, and a strong standards organization, the Uniform Code Council, UCC, has had difficulty in the adoption of the global successor to the twelve digit UPC, the fourteen digit Global Trade Item Number, GTIN. The GTIN, like the UPC, identifies the company that sells the item and provides up to five digits for the company to assign for item identifiers. Five digits provide 100,000 unique combinations 00000 to 99999. RosettaNet defines "Partner Interface Processes", PIP's, the business transactions between trading partners to accomplish elements of larger processes. An example is PIP 2A9: Query Technical Product Information which defines how one trading partner can query the catalog of another over the Internet and receive a response with either the item identifier of an item matching the description of the item in the query or an indication that there is no matching item. The PIP defines the Extensible Markup Language, XML, message formats and the state behavior of each partner depending on the decisions indicated in the XML messages. Another example is PIP 3A4: Manage Purchase Order which defines how one trading partner can send a purchase order to a trading partner and the management of the purchase order between the order placement and delivery. RosettaNet and the UCC want to standardize the definition of the item identifier in the XML messages and have chosen the GTIN as the standard. While it may appear that many of the items are simple and can be assigned a GTIN, closer inspection reveals a level of complexity that will be difficult to accommodate with the use of the GTIN as currently defined.

Figure 1:
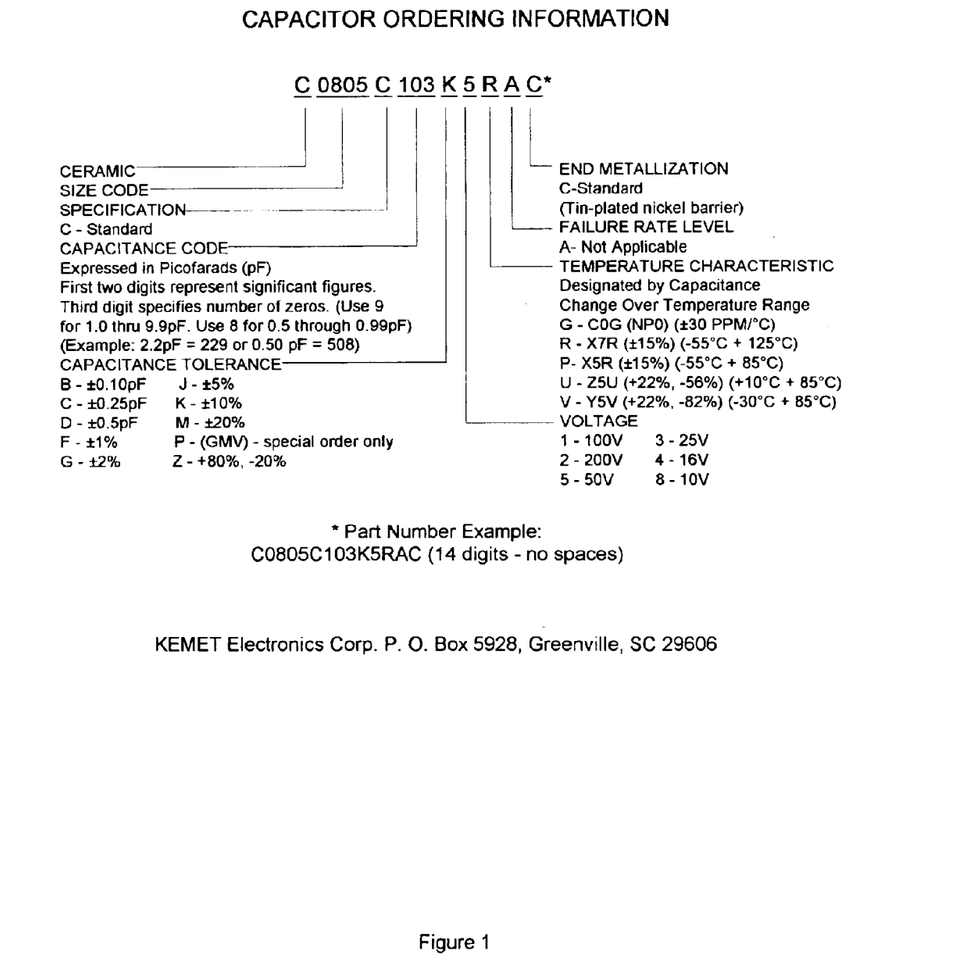
FIG. 1 illustrates the encoding of a Kemet Electronics Corp. capacitor configuration values into the Kemet item identifier.

Many of the electronic items have a wide range of configurable options in the specification of the orderable item. As an example, a capacitor, a simple electronic part, is described by a set of properties such as the capacitance value, tolerance, resistance, body size, carrier package, etc. Selecting values for each of these properties specifies a capacitor. The values are typically encoded in the part number, the item identifier. In the example of the sugar supplier, the bag size was encoded in the part number. The capacitor suppliers encode the values for each of these variables into the item identifier using algorithms that assign portions of the item identifier to each of the variables. For example, as illustrated in FIG. 1, the item identifier for a Kemet Electronics Corp. capacitor is C0805C103K5RAC where the first character encodes the capacitor type (Ceramic), the next four characters encode the capacitor body type (0805), the next encodes the specification (Standard), the next three encode the capacitance value (0.50 pF.), the next character encodes the tolerance, the next the resistance value, etc. Numbers and letters are used. Thus, in a small number of characters, 6 to 20, the possible configurations for a Kemet ceramic capacitor are covered. However, the number of possible combinations are very large. Six alphanumeric characters can encode over two billion combinations. Most combinations will never be used. In addition to the capacitor characteristics encoded in the Kemet item identifier, information about the carrier of the capacitors is required and added as a suffix to the encoded identifier. The buyer cannot buy one capacitor but buys them in carriers designed to feed the capacitors into the assembly equipment. There are a number of different carriers to fit different assembly equipment and the carrier must match the equipment requirements. For example, Mylar tape on a 12" reel carrier holds 10,000 capacitors and a bulk carrier holds 15,000 capacitors. A buyer that has assembly equipment that needs the Mylar tape carrier must not order the bulk carrier. The number of combinations of capacitor characteristics and carriers is very large. Assigning a GTIN for each of the possible combinations is not possible: 1) The number of possible combinations is larger than the 100,000 values of a GTIN and 2) The mapping of combinations to GTIN values would require a table with as many rows as combinations. The algorithms that map the variable values to a finite number of characters are very effective. However, this structure is not consistent with the RosettaNet and UCC definition of the use of the GTIN as currently defined except for those cases where the algorithm can map the variable values into the five digits that a company can control. The algorithms for each company, even those who manufacture identical items, for example capacitors, are unique to each company. The systems of each company are built around the part number so this will not be easy to change.

Figure 2:
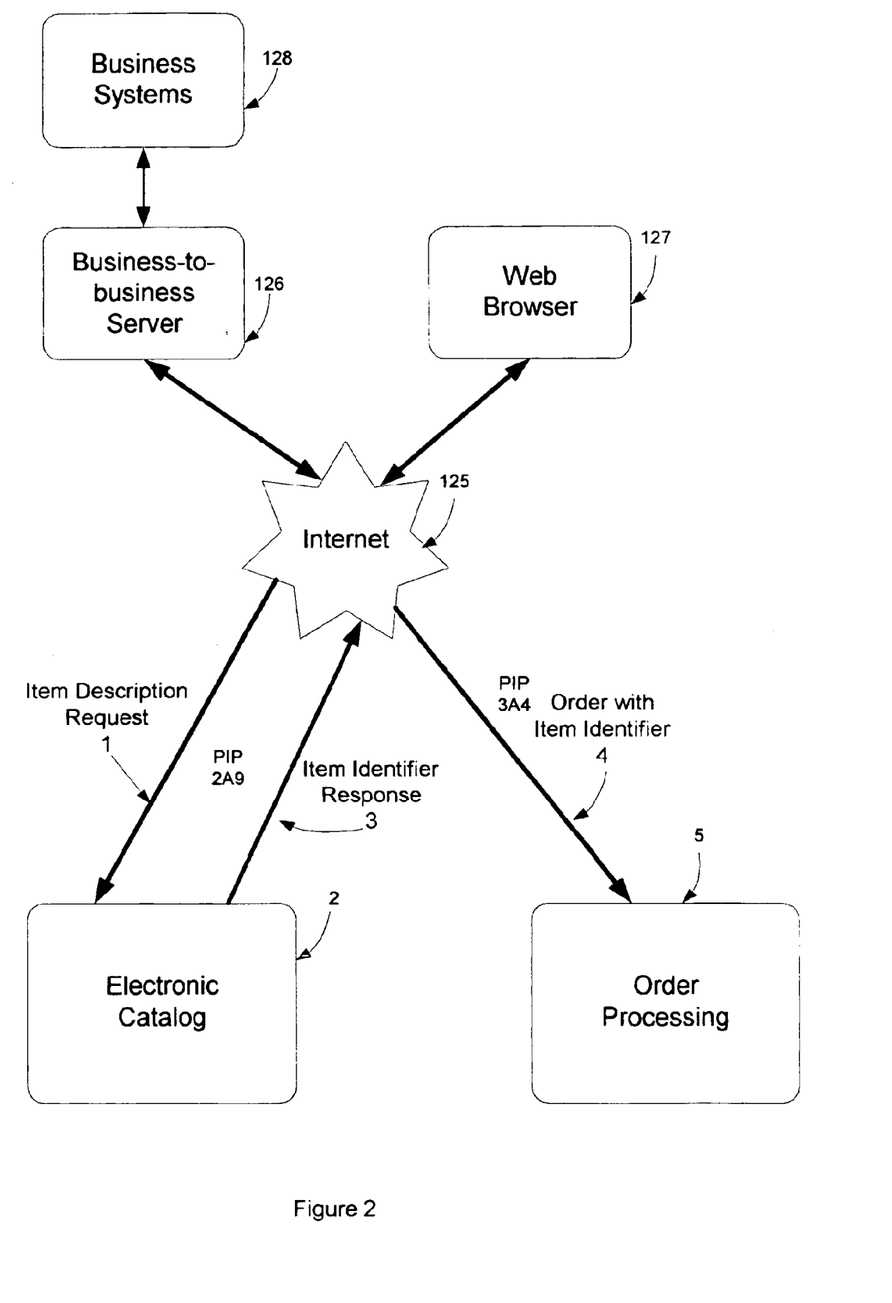
FIG. 2 illustrates the processes where a buyer sends a request to a seller's catalog for an item identifier using an item description, receives an item identifier, and uses the item identifier in an order to purchase the item.

However, RosettaNet has achieved a significant milestone in the definition and agreement of the catalog structure, the taxonomy of how the characteristics and values are expressed in the description for each item. Thus, searching for and defining each item can be done in a consistent process and the resulting definition for identical items from different manufacturers can be the same. The RosettaNet vision is illustrated in FIG. 2 where a buyer can connect through the Internet 125 to a seller's Web site with a catalog using a web browser 127 or a business-to-business server 126 and send an item description 1 to the seller's electronic catalog 2 using the RosettaNet PIP 2A9: Query Technical Product Information. The catalog 2 responds with the item identifier 3 if the seller has an item matching the description. The buyer can then order the item using the item identifier provided by the seller's electronic catalog by sending an order 4 using the RosettaNet PIP 3A4: Manage Purchase Order to the seller's order processing system 5. However, the products or services provided by the seller may not be covered by the RosettaNet standard and the RosettaNet 2A9 will not be sufficient to accommodate the characteristics that are not standard.

The function of the item identifier is for the supplier or seller to provide the item defined in the item description. The buyer uses the seller's catalog to determine the item identifier. Essentially the seller is telling buyers, "If you want to order the item you described, ask for it using the item identifier that is provided as the response". The item description and form of the response must be standardized for this process to work. However, the item identifier need not have a standard since the item identifier need only be used with a specific catalog. RosettaNet has achieved a level of standardization but cannot cover all of the possible functions, features, and services provided by trading partners in the electronic industry. The item identifier must fully identify the item if the process is to operate with systems and remove the need for human interpretation or intervention.

In the past, the item identifier was processed by people and needed to be short enough so that a person could write it in an order form with minimum transcription errors. However, the orders are now created by computer systems and processed by computer systems. The item identifiers can now be much longer so that formats and processes can be standardized.

In the electronics industry, some buyers do not select an item from the seller's catalog but sends the description of the item and ask the seller to deliver the item using the buyer's item identifier to identify the item. In many cases, the seller has the item in the catalog but must still use the buyer's item identifier. Or, the seller has a similar item and modifies the item to meet the buyer's requirements. For example, the buyer wants the buyer's logo to be printed on the item where the item is already in the sellers catalog. The item identifier process must accommodate this form of item identification.

The RosettaNet standard processes, catalog taxonomies, and the use of GTIN as the only item identifier are not sufficient to support the requirements of the electronics industry and other industries where the items have a high number of configurations. The objective of RosettaNet is to provide the structure so that trading partners can rely on standard processes and data formats such that third parties can provide much of the systems and software and custom development can be avoided or at least minimized. This also permits connection to new trading partners with a minimum of effort and delay. Solving the configured item identifier problem will provide a complete framework for RosettaNet and thus, provide the benefits of a standard. The standard must provide a means for accommodating item properties that are not standard. In addition, it is desirable that the solution permits use of current systems wherever possible.

DESCRIPTION OF THE INVENTION

The key objective of a standard is to enable those who conform to the standard to easily execute transactions with others who conform to the standard. The process illustrated in FIG. 2 is the desired goal: a buyer can send a description to a seller and receive an item identifier for an item fitting the description; the item identifier is then used to order the described item. The seller is saying "If you want to order the item you described, ask for it using the item identifier that is provided as the response". A set of items is described by a set of properties. Providing a value for each property identifies a specific item in the set. An item where the buyer assigns the values for a set of properties is called a configured item. The configured items in electronics industry are characterized by the large number of possible unique items due to combination of the number of properties and number of valid values. The constraints of the 14 digit GTIN do not provide enough distinct values to transfer the information to identify most configured items. Recall that the UPC and its successor, the GTIN evolved to support bar code labels for point of sale processing. RosettaNet and other XML based standards are to support the processes and information passed between trading partners and need not be constrained to the 14 digit GTIN for item identification. However, the GTIN has significant function that can be used. The GTIN is fixed length, the "owner" of the GTIN is identified in a standard set of digits and the owner registration processes are robust and used globally. The GTIN can be used as originally envisioned for items with limited configurations by assigning each configuration its own GTIN. However, the GTIN must be augmented to accommodate configurable items, which are a large proportion of the items in the electronics industry. Most suppliers, Kemet as an example, have an item identification algorithm that maps or encodes the configuration values (property values) into alphanumeric characters that are then concatenated with other characters to form the item identifier. Suppliers have their own unique algorithms to map the configuration into an item identifier. It is not reasonable to expect that the algorithms will be standardized. However, RosettaNet and its members have agreement on the catalog taxonomy (the catalog structure, standard item properties, and means for expressing the values for standard properties) and the XML message structure to describe a desired item by listing the properties and values. The supplier can keep their own internal representation of the catalog but to support the standard, must accept the RosettaNet XML description and find in their catalog the item that matches the description (if it is in the catalog).

The present invention defines a catalog, a catalog query with a response, and a two-part item identifier: the fixed length GTIN that identifies the class of the item in the catalog and an optional variable length XML string that provides additional property value information of the item within the class. The GTIN format is as defined by the UCC and RosettaNet where 9 digits are used to identify the "owner" of the GTIN and other information and 5 digits are assigned by the owner. The 5 digits in the GTIN provide 100,000 unique identifiers. As described earlier, the number of unique identifiers is too small to identify all of the possible combinations of the properties and values of most electronic products. The catalog owner creates the catalog following the RosettaNet Technical Dictionary specification and has the option to extend the catalog structure with additional properties and choices of property values. The extension will be described in a later section. The catalog has a structure, a taxonomy, where a class of items share values assigned to a first set of properties but differ in values for a second set of properties. For example, a configurable item has four properties: voltage, capacitance, carrier, and shape. The choices for voltage are: 10 volts, 20 volts, 50 volts, and 100 volts. The choices for capacitance are values between 1 pF and 100 pF in steps of 0.5 pF, values between 101 pF and 200 pF in steps of 1 pF. The choices for carrier are 13" Mylar tape reel, 7" Mylar tape reel, 7" paper tape reel, and bulk cassette. The choices for shape are: 0805, 0603, 0402, and 1206. The catalog owner assigns a GTIN to identify a class of items. For the example, the catalog owner can assign one GTIN, "GTIN-A", to the class of items where none of the properties are assigned a value and the values for the four properties must be assigned to specify an item. GTIN-A and the specification for voltage, capacitance, carrier, and shape completely specifies an item. The catalog owner can also chose to assign another GTIN, "GTIN-B", to the class of items where voltage is 10 volts. GTIN-B and the specification for capacitance, carrier, and shape completely specifies an item with the voltage property equal to 10 volts. A buyer uses a query with a description of an item by providing a choice for each property to request from the catalog an item identifier for an item matching the description. For the example, a request might be for an item with voltage=10 volts; capacitance=20.5 pF; carrier=7" Mylar tape reel; shape=0805. The catalog will respond with GTIN-B and XML string "<c>capacitance=20.5 pF; carrier=7" Mylar tape reel; shape=0805</c>". (Note the "<c>" and "</c>" are to denote the beginning and end of the XML string.) The property choices are encoded in an XML string and associated with the GTIN, GTIN-B. The combination of the GTIN and the XML string fully specifies the item. For example, Kemet can assign a GTIN to the class of capacitors with the property material type=ceramic and where the properties of capacitance value, body shape, tolerance, carrier, etc. must be chosen to fully specify the orderable item. The choices for these properties are encoded in an XML string so that the GTIN and the encoded choices represent the fully specified purchasable item.

Figure 3:
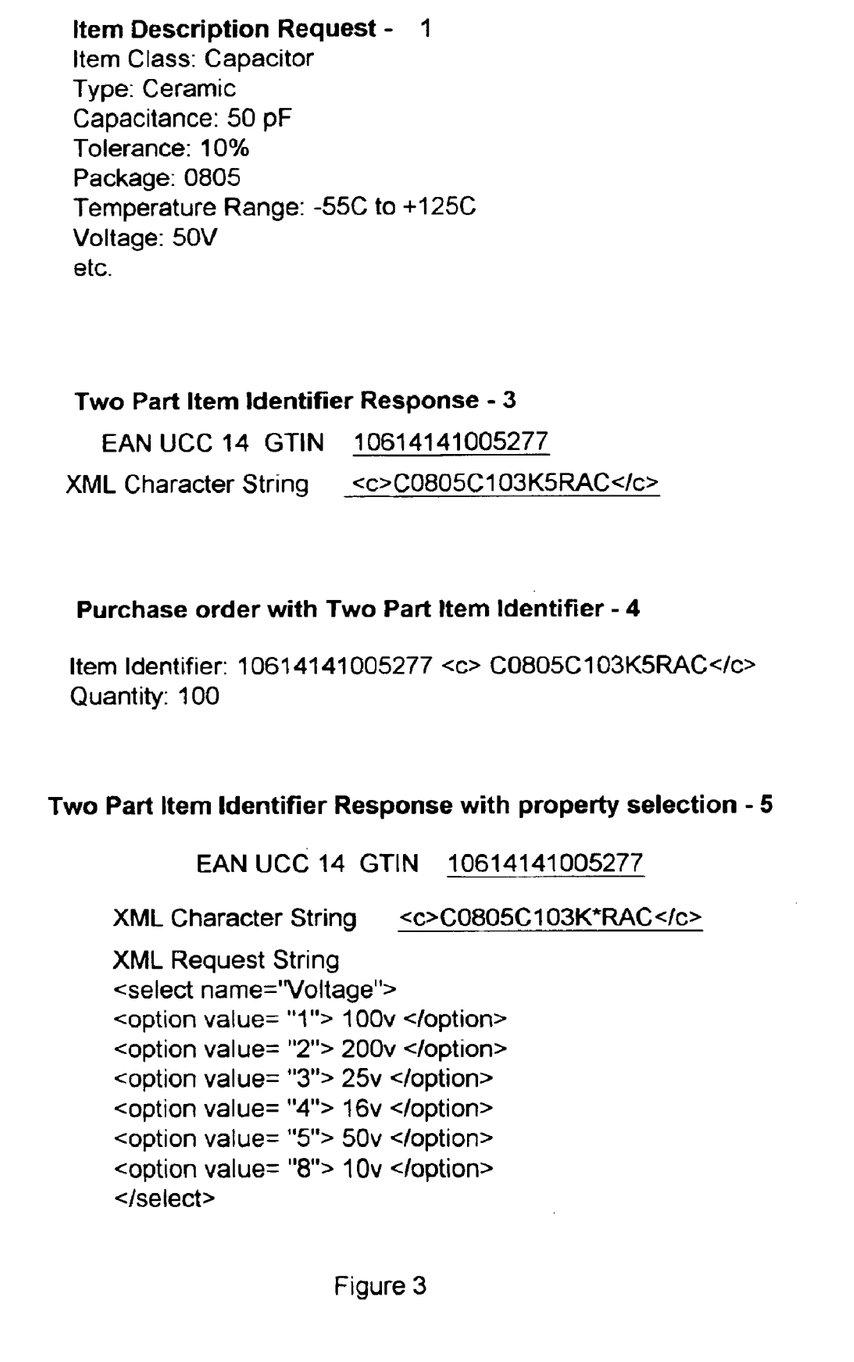
FIG. 3 illustrates the item description request to the catalog, the response with a two-part item identifier, the item order with the item identifier, and a response requesting additional item description.

The encoding of the XML string need only be consistent for each catalog since the GTIN and XML string have significance only in the context of a specific catalog. Thus, Kemet could select to use their current part number format to encode the ceramic capacitor properties. Thus, the two-part item identifier would consist of the Kemet GTIN for ceramic capacitors and an XML string encoding the current Kemet ceramic capacitor item identifier. FIG. 3 illustrates a Two-part Item Identifier Response 3 where the GTIN is the string "10614141005277" that identifies the class of Kemet ceramic capacitors and the XML string defining the additional properties to identify a specific item is "<c>C0805C103K5RAC</c>" where the Kemet decoding of the contents of the XML string is illustrated in FIG. 1.

It is envisioned that buyers would query the catalogs of suppliers to determine if the item described is provided by a supplier and if so, pricing, availability, etc. To minimize customization of the query for each catalog, the catalog query that includes the description of the item should conform to a standard. The RosettaNet 2A9 PIP can be used to query the catalog. If the query completely specifies an item, the GTIN and associated XML string is returned. The two-part item identifier, the GTIN and XML string, is used in the other RosettaNet PIPs to order the item and in other PIPs that require item identification. If the item description is not complete, that is not all the item properties assigned valid values, the response from the catalog to the 2A9 would include a second XML string with a request for assignment of values to the properties without valid values. The second XML string may include the valid choices for the property. The catalog query can be in the form of a RosettaNet PIP or similar network message or can be done from a web page.

An item in the catalog may have a property that is not in the RosettaNet standard and a value for this property would not be in the RosettaNet 2A9 query. The catalog response to the standard 2A9 query could be an XML string indicating the property and the need to assign a value. The XML string may include the valid choices for the property.

The GTIN designates an entry into the catalog where the properties in a set have defined values shared by all items in the class. The GTIN may correspond to a fully specified item thus the XML string is empty and only the GTIN is needed in the RosettaNet PIP's to identify the item to order the item or for other processes that require item identification. In general, the GTIN corresponds to a class of items with the same values for a first set of properties and the values for a second set of properties be chosen to fully specify the item. The second set of properties and the encoding of the selected values into an XML string may be different for each class of items. In the example, Kemet may have three classes of capacitors: ceramic, tantalum, and aluminum. Each class may require different properties and range of property value choices to fully specify an item. The encoding of the choices may be different for each class. That is, the ceramic capacitor may have an encoding algorithm different from that for tantalum capacitors or that for aluminum capacitors. The GTIN assigned to ceramic capacitors is different from the GTIN for tantalum capacitors or the GTIN for aluminum capacitors. So, the meaning of the associated XML strings may be distinguished by the associated GTIN and decoded using the appropriate algorithm.

The supplier may require for a class of items properties that are not defined in the RosettaNet Technical Dictionary taxonomy. These properties are an extension to the catalog standard. These properties and, optionally, the valid choices for each property are returned in response to the 2A9 catalog query. For example, a supplier may offer marking each capacitor with the logo of the buyer. The marking service may not be offered by most capacitor suppliers and would not be part of the standard 2A9 query for capacitors. However, the supplier can show that the marking service is available in the response to a 2A9 query. The buyer would select to use or not use the marking service by selecting the appropriate field in the 2A9 response and return the 2A9 query. The supplier catalog would respond with the appropriate GTIN and XML string indicating the choices for the properties. The modified 2A9 will permit properties that are not part of the RosettaNet standard to be selected and specified in the communications between seller and buyer.

The 2A9 query and the response to a 2A9 query can be an XML message or can be a link to a web page. It is expected that a person will resolve the choice of values for the properties that are needed to fully specify the item. The response may include the valid value choices for properties that require definition. Once the values are selected, the GTIN and XML string in the response will fully specify the item.

The GTIN assigned by the supplier specifies a class of items in the supplier catalog that share common values for a set of properties. An associated XML string further specifies a subset or subclass of the class of items specified by the GTIN by assigning values to properties not assigned in the class. The class or subclass of items may have significance even if it does not identify a specific item. For example, a buyer of Kemet capacitors may have an agreement with Kemet to purchase a specific dollar amount of ceramic capacitors. The buyer may also be buying other classes of Kemet capacitors so adding up all of the purchases from Kemet will not track the dollar amount of Kemet ceramic capacitors purchased. However, adding up all of the purchases for items with GTIN corresponding to the Kemet ceramic capacitor will provide the dollar amount. Note the difficulty to perform this calculation if every item had its own GTIN. Each GTIN would need to be decoded to identify the item class and then the purchase amount added to the sum if the GTIN corresponded to the selected item class. Appropriate grouping of items into item classes and assignment of a GTIN to each class can provide benefits in addition to item identification.

The supplier defines the item class, the GTIN corresponding to the item class, and the XML extension. FIG. 3 illustrates the key contents of the Item Description Request 1 where the properties and values corresponding the standard RosettaNet 2A9 query are shown. The actual values would be encoded into an XML message conforming to the 2A9 standard format and the query is sent to the supplier catalog using the Internet. If the values in the 2A9 message completely specify an item, the catalog responds with the two-part item identifier in the Item Identifier Response 3. The GTIN, illustrated by the string "10614141005277", consists of 14 characters where 9 characters identify the supplier and provide the error checking and control of the GTIN. Five characters are assigned by the catalog owner to identify the class of items corresponding to the GTIN. The XML string "<c>C0805C103K5RAC</c>" is an encoding of the property value choices as illustrated in FIG. 1 sent to the catalog in the 2A9 query. Note that in the example for Kemet, this is the same as the current Kemet item identifier for a ceramic capacitor with the specified properties. The catalog owners can continue to use their proprietary encoding of property values to character strings as used for the one-part item identifier. A Purchase Order, for example a 3A4 PIP, would use the item identifier 4 where the GTIN and XML string are concatenated and the quantity, in the example 100, part of the message. The XML syntax and format of the 2A9 and 3A4 messages are defined in the RosettaNet PIP's. As disclosed in the associated patent application, the GTIN and XML string may be kept in a Business-to-business system or PIP processing system and referenced by the Enterprise Resource Planning system or other system using a pointer or other data element consistent with the part identifier structure of the system to associate the GTIN and XML string to the item.

If the information in the 2A9 query is not sufficient to fully specify an item, the catalog responds with the GTIN, the XML string with the values that could be determined (note the "*" in the XML string where the voltage value would have been indicated), and a request string indicating the property or properties that need selection and the values that are permitted. The two-part identifier response with a property selection 5 illustrates the response to a query that did not indicate a valid selection of the Voltage property. The valid choices are indicated by the list of options in the response string. The "<select name="Voltage">" and "</select>" tags indicate the beginning and end of the selection choices and the list of "<option value="1"> 100v </option>" indicate the valid choices for the Voltage property. The selection structure as illustrated would in a Web browser display a list box with the voltage values where one of the values could be selected.

A partially specified GTIN and XML string may be used to identify classes or subclasses of items. The GTIN and XML string in the two-part identifier response with a property selection 5 can be used to identify the subclass of all Kemet ceramic capacitors independent of the voltage rating. As described earlier, the GTIN can be used to identify Kemet ceramic capacitors. The partially specified two-part identifier can be used for aggregation of purchases, etc. or to order an item where the property is not significant and ignored. Perhaps in the example of FIG. 3, the capacitor may be used in a very low voltage environment and the voltage property is not important. The two-part item identifier with response selection 5 may be used to order the ceramic capacitors where voltage property is not significant.

The two-part identifier response with a property selection can have property selections that are not part of the 2A9 standard as specified by RosettaNet. Using this mechanism, a supplier can provide properties that are of competitive value but not part of the standard. Added customer services such as marking the units with the buyers logo, special packaging of the items, adding new functions, etc. may be requested and specified in the response to the original query.

The GTIN specifies a class of items with specific values assigned to a set of properties. The XML string can also be used to modify a property in the class of items associated with a GTIN. For example, a GTIN, "GTIN-C" is assigned to all ceramic capacitors that have a voltage range of 10 volts to 100 volts. Suppose the capacitor supplier provides a customized capacitor with a 200 volt property. The XML string can be used to change the voltage property of the class specified by GTIN-C to 200 volts. That is, GTIN-C and <c>Voltage=200</c> could signify the class of items in GTIN-C with the voltage property changed to 200 volts.

A second catalog query with item identifier can request from the catalog the properties and values that describe the item in the catalog. This query asks, "Given this item identifier, what is the description of the item?" The item identifier may identify a class of items and the description may not have values for all the properties required to describe a specific item. For example, an item identifier may identify the class of ceramic capacitors independent of the voltage and the description of the item will not have a value for the voltage property.

In some buyer-supplier relationships, the buyer describes the item and asks that the supplier provide the item. The buyer is then the catalog owner. As the catalog owner, the buyer creates the item classes by assigning values to properties and assigning GTINs to each class of items that share the same values for a first set of properties and uses an XML string to encode the values for a second set of properties. The seller can access the buyer catalog using the GTIN and optional XML string provided by the buyer as the item identifier to determine the values for the properties that describe the item. The buyer specified GTIN and XML string are used as the item identifier in the RosettaNet PIPs between the buyer and supplier.

In the electronics industry, some buyers order items through third parties such as distributors or electronic manufacturing service providers. The third parties obtain these items from suppliers. The buyer does not specify the supplier or the supplier item identifier in the transactions since a supplier in a set of suppliers can provide the item. The third party may provide the translation and transactions between the buyer and seller where the buyer has a catalog defining the items it wants to purchase using the GTINs and associated XML strings as defined by the buyer and the supplier has a catalog defining the items it wants to sell using the GTINs and associated XML strings as defined by the supplier. The third party queries the buyer's catalog and determines the property values for an item as specified by the buyer in the buyer GTIN and XML string item identifier. The third party queries the supplier's catalog using the property values and determines the supplier's GTIN and XML string for an item that matches the buyer's description. The buyer orders the item from the third party using the buyer GTIN and XML string and the third party orders the item from the supplier using the supplier GTIN and XML string. In some cases, the supplier may accept the buyer's GTIN and XML string as the item identifier. The buyer catalog provides a means by which an item can be characterized and the item identifier determined. The item identifier of an item from a first catalog is used to identify the property values of the item and the property values are used to determine the item identifier of an item in a second catalog that matches the property values.

The process envisioned by RosettaNet illustrated in FIG. 2 may not be as simple as a 2A9 query to a catalog with an item description request 1 and an item identifier response 3 with the item identifier but may be an iterative loop where the catalog responds to the 2A9 query with a partial item identifier and request for additional information. The additional information requested may not have been specified in the RosettaNet 2A9 standard but may be for properties specified by the supplier. The buyer iterates until the two-part item identifier specifies the item to level of specificity needed by the buyer and seller.

The catalog defines classes of items where each class has properties with assigned values. A class can be a subclass of another class. A GTIN is assigned to each class. If a class completely specifies an item, the GTIN is the item identifier. If additional properties need values to be assigned, the value assignment is signified in an XML string such that the GTIN and XML string completely specify an item and is the item identifier used in all RosettaNet PIPs that require item identification. The catalog provides a means to accept a description of an item as a set of properties with values and returns the GTIN and XML string, if needed, as the item identifier for an item in the catalog that fits the description. The catalog may respond with a request for values for properties not specified in the description. The requestor and catalog may iterate request-response messages to refine the description of the item through the assignment of values to properties. The GTIN and XML string may specify a subclass that may be used for other purposes such as aggregating the amount of items in the subclass purchased. The XML string may modify the value of a property specified in the class assigned the GTIN. The catalog may be queried using the item identifier of an item or class and the catalog responds with the description of the item or class. The buyer may be the owner of the catalog and the supplier may query the buyer's catalog to determine the property values of an item. A third party may query a buyer's catalog and buyer's item identifier to determine the property values for the item and use the property values to query a suppliers catalog to determine the supplier's item identifier for the item. The third party can then accept an order from the buyer using the buyer's item identifier and order the item from the supplier using the supplier's item identifier.

Description of a Preffered Embodiment

The catalogs and adapter functions are implemented as software programs written in Java, C++, Microsoft Visual Basic, or a number of programming languages. The programs may use a database for storing translation tables and other information. Database programs are available from Oracle, IBM, Microsoft, and many other providers. These programs and databases execute in computers manufactured by, for example, IBM, Sun, Dell, and Compaq. The computers may be, for example, PC's, workstations, mainframes, and hand-held computers. The computers may have an operating system such as UNIX, LINUX, Microsoft 2000, and IBM OS/9000. The computers are connected to a network that may be, for example, a LAN, WAN, Internet, Intranet, wireless LAN, or wireless Internet.

Figure 4:
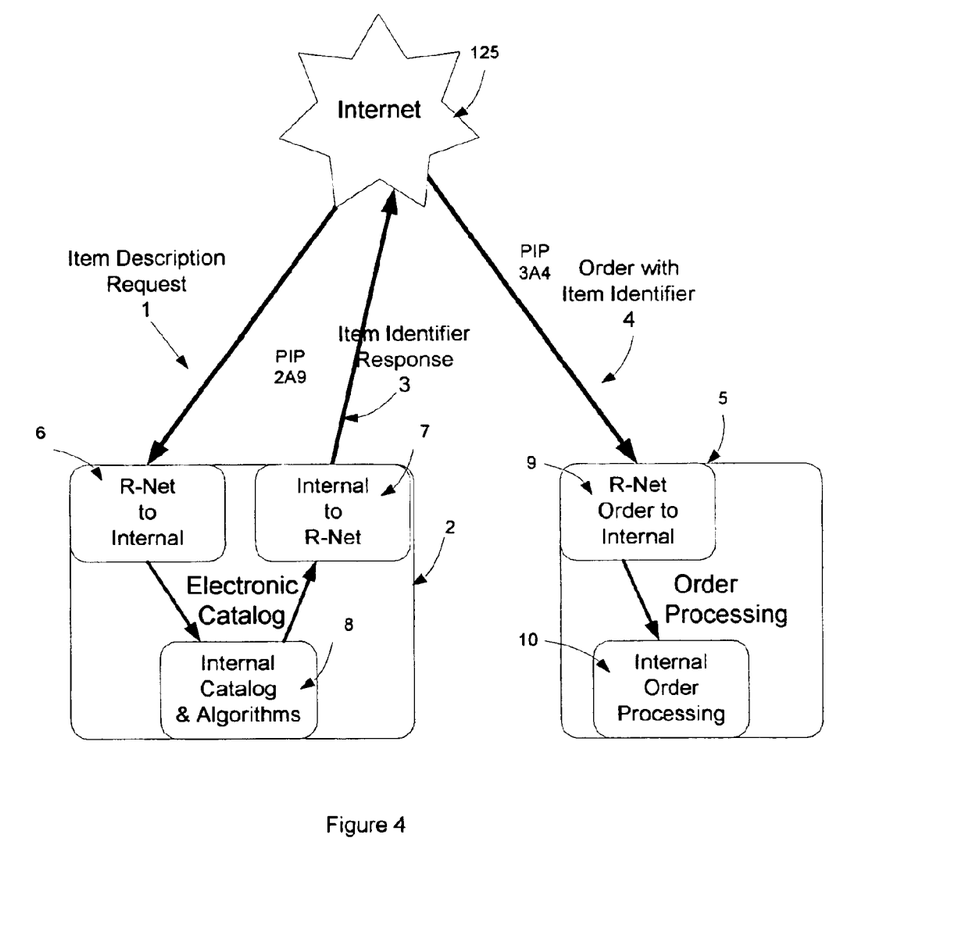
FIG. 4 illustrates the seller's system translations of the item description in RosettaNet form to an internal catalog process, the internal catalog response to the RosettaNet form with a two-part item identifier, and the item order in RosettaNet form with a two-part item identifier to an internal order process.

The functions are illustrated in FIG. 4. The R-Net to Internal adapter 6 receives the 2A9 query Item Description Request 1 from the requester as a RosettaNet PIP using the Internet 125. The R-Net to Internal adapter 6 is program that transforms the item description query in RosettaNet XML form into the internal catalog query form of internal catalog is highly dependent on the internal catalog and algorithms 8 and associated programs. Much of the transformation is a mapping of fields of the RosettaNet query into the fields of the internal catalog query. The data values must also be translated from the RosettaNet XML form to the internal catalog form. These translations may be embodied as algorithms, e.g. moving values from a RosettaNet field, multiplying the value by a factor and inserting in to a catalog field; as translations, e.g. a value in a RosettaNet field is used as a search argument in a relational database to find its translation into a value in the catalog internal form; or a combination of these operations. The other programs for the catalog include translating the RosettaNet item identifier into and from the internal form are primarily algorithms that are dependent on the specific formats but are well understood by those skilled in the art. For example, each item class has values assigned for a first set of properties and assigned a GTIN. In the case of Kemet capacitors, all ceramic surface-mount capacitors can have the same GTIN. Tantalum capacitors are assigned another GTIN, etc. The algorithm for generating the XML string that embodies the values for the second set of properties can be the same algorithm that generates the current item identifier from the properties and values as illustrated in FIG. 1. The Internal to R-Net adapter 7, using the Kemet example, determines from the catalog if the capacitor is ceramic and if so inserts the GTIN for ceramic capacitors and appends the current item identifier as an XML string and outputs the two-part item identifier as the Item Identifier Response 3. The R-Net Order to Internal adapter 9 accepts the two-part item identifier in an Order Item Identifier 4, removes the GTIN, and converts the XML string into the current identifier used by the internal systems. The R-Net to Internal adapter 6 also determines if all of the properties have valid values by checking each value against a relational table of valid values or value ranges. If a property does not have a valid value, an XML string indicating the need for a property value is appended to the response sent back to the requester by the Internal to R-Net adapter 7. The property need not be limited to those defined by the RosettaNet standard and may include properties defined by the catalog. The response may include an XML string indicating the valid value choice for a property.

I claim:

1. A catalog system providing a two-part item identifier for an item described by an item description including a first set of values for a first set of properties, the catalog system comprising:
   means to accept a query including the item description;
   means to determine from the first set values of the item description a two-part item identifier that includes:
      a fixed length part that identifies the catalog system
      a variable length part that identifies the item in the catalog system
   means to respond to the query with the two-part item identifier for the described item.

2. The catalog system of claim 1, wherein the catalog system further provides means to accept a query that includes the two-part item identifier for the described item, means to determine the item description from the two-part item identifier, and means to respond with the item description.

3. The catalog system of claim 1, wherein the fixed length part of the two-part item identifier is systematically assigned to the catalog system so that the catalog system can be systematically determined from the fixed length part.

4. The catalog system of claim 1, wherein the item description is used to query a second catalog system which responds with a second two part item identifier where the fixed length part identifies the second catalog system and the variable length part identifies the item in the second catalog system such that the second catalog responds to a query including the second two part item identifier with the item description.

5. The catalog system of claim 1, wherein the item description provides the first set of values for properties, the catalog system requires an additional property value to determine the item in the catalog system and the catalog system responds with a request for the additional property value.

6. The catalog system of claim 1, wherein a set of items having the same set of values for a first set of properties and different sets of values for a second set of properties is identified by a two-part identifier.

7. The catalog system of claim 1, wherein a set of items with the same set of values for a first set of properties and different sets of values for a second set of properties is identified by a first two-part identifier and subset of items in the set is identified by a second two-part identifier comprising the first two-part identifier with an extension specifying a set of values for a subset of the second set of properties.

8. The catalog system of claim 1 and a second item description for a second item that differs from the item description of the item by a value in a property wherein the second item with the second item description is identified by a second two-part identifier comprising the two-part item identifier for the item with an extension specifying the differing value in the property.

9. The catalog system of claim 1 and a trade document including purchase orders, receipts, bills of material, and shipping documents, where in the two-part item identifier is used in the trade document to identify the described item.

10. A method for identifying an item in a first catalog where the item is described by an item description that includes a set of values for a set of parameters by providing a first two-part item identifier comprising:
   a fixed length part including a first catalog identifier and
   a variable length part including a first catalog item identifier
   wherein the method includes:
      receiving a request including the item description
      determining from the item description set of values, the first catalog item identifier
      concatenating the fixed length first catalog identifier and the variable length first catalog item identifier to form the first two-part item identifier responding to the request with the first two-part item identifier.

11. The method of claim 10 further includes:
   receiving a request including the first two-part identifier
   determining from the first two-part item identifier the item description responding to the request with the item description.

12. The method of claim 10, wherein the first catalog identifier is systematically assigned for systematic Identification of the first catalog.

13. The method of claim 10 and a second catalog, wherein a request including the item description is made to the second catalog and the second catalog responds with a second two-part item identifier comprising: a fixed length part including a second catalog identifier and a variable length part including a second catalog item identifier; such that a request including the second two-part item identifier to the second catalog results in a response including the item description from the second catalog.

14. The method of claim 10, wherein the first catalog requires a value for a parameter not in the set of parameter values in the item description to determine the first catalog identifier and the catalog responds with a request for the additional parameter value.

15. The method of claim 10, wherein a set of items with the same first set of values for a first set of parameters and different sets of values for a second set of parameters identified by a two-field identifier.

16. The method of claim 10, wherein a set of items with the same first set of values for a first set of parameters and different sets of values for a second set of parameters is identified by a first two-field identifier and a subset of items in the set is identified by a second two-field identifier comprising the first two-field identifier with an extension to the variable length part specifying a set of values for the second set of parameters.

17. The method of claim 10, and a second item description for a second item that differs from the first item description for the first item by a value for a parameter wherein the second item with the second item description is identified by a second two-field identifier comprising the first two-field item identifier for the first item with an extension to the variable length part specifying the value in the parameter.

18. The method of claim 10 and a trade document including purchase orders, receipts, bills of material, shipping documents, wherein the first two-field item identifier is used in the trade document to identify the first item.

19. A two-part item identifier data structure embodied on a computer-readable recording medium that specifies an item in a first catalog where an item description is a set of values for a set of properties wherein the two-part identifier provides a fixed length part that identifies the first catalog and a variable length part that identifies the item in the first catalog such that the first catalog responds with the two-part identifier to a query including the item description.

20. The two-part item identifier of claim 19 and a trade document including purchase orders, receipts, bills of material, and shipping documents, wherein the two-part item identifier is used to identify the item.

* * * * *